Dec. 13, 1960  R. W. KETCHLEDGE  2,964,265
STEERING SYSTEM UTILIZING THERMAL-ENERGY RADIATIONS
Filed March 26, 1948  4 Sheets-Sheet 2

INVENTOR
R.W. KETCHLEDGE
BY
G.H. Heydt
ATTORNEY

Dec. 13, 1960  R. W. KETCHLEDGE  2,964,265
STEERING SYSTEM UTILIZING THERMAL-ENERGY RADIATIONS
Filed March 26, 1948  4 Sheets-Sheet 4

INVENTOR
R. W. KETCHLEDGE
BY
G. H. Heydt
ATTORNEY

United States Patent Office 2,964,265
Patented Dec. 13, 1960

2,964,265

STEERING SYSTEM UTILIZING THERMAL-ENERGY RADIATIONS

Raymond W. Ketchledge, Jamaica, N.Y., assignor to Bell Telephone Laboratories, Incorporated, New York, N.Y., a corporation of New York Filed Mar. 26, 1948, Ser. No. 17,319

8 Claims. (Cl. 244—14)

This invention relates to automatic steering systems and in particular to steering systems and methods utilizing thermal-energy radiations for navigational purposes.

An object of the invention is to provide an automatic steering system of improved efficiency.

Another object is to provide equipment for obtaining accurate steering information from signal pulses for directionally controlling a moving body.

A further object is to provide an improved steering system for a self-guided search and homing device.

Other objects and features will be apparent from a study of the specification and attached drawings.

The invention may utilize that form of radiant-energy which is contained in the general designation of thermal-energy radiation and which includes visible light, ultraviolet and infra-red radiations. In the preferred embodiment of the invention infra-red radiations of wavelengths between 7000 and $4 \times 10^6$ angstrom units are utilized.

The art of controlling a moving body from a distance has numerous advantages among which are, the fact that a human pilot is not needed, the inability of humans to withstand the necessarily high accelerations sometimes used in launching and maneuvering moving bodies is be eliminated as a limiting factor, and also the moving bodies may be made as small in size as is desired. It may also be desirable to change the course of a body after it has been launched in order to compensate for mechanical or human errors, which may have occurred in launching the body. Numerous guiding systems exist; some of these systems obtain steering information from radiant-energy receivers positioned within the moving body and convey the information to an automatic steering system which charts a space path along which the body will travel. Other types of steering systems usually termed homing systems seek out certain targets and home to the target guided by radiant-energy emissions emanating from and peculiar to the target. In some moving bodies flight stabilization is attained by utilizing gyros so that the steering control equipment will have proper orientation with respect to the controlling signals.

In the art a distinction is sometimes drawn between guided missiles and pilotless aircraft. The term guided missile usually designates bodies which depend upon a thrust or a power for flight sustaining abilities, and the term pilotless aircraft usually designates devices which depend upon wings or projection surfaces to sustain their mass in flight. The invention as disclosed herein is applicable to either guided missiles or pilotless aircraft.

In the particular embodiment of the invention described herein a proportional azimuthal steering function is obtained from a control of the amplitude and polarity of signal pulses, which are translated from thermal-energy radiations emanating from a target, respective to the degree and direction of the excursions of a scanning unit at the instant the unit traverses a target. A vertical steering function is attained and is based upon a determination of the polarity and magnitude of a differential between signal pulses initiated by the scanning unit viewing upper and lower halves of a vertical field of view. A circuit is also provided to obtain a vertical steering function in accordance with signals received from the vertical steering control circuit.

An electronic clamp circuit contained in the body retains an output signal voltage indicative of the bearing of a thermal-energy emission source of the greatest intensity encountered in a given scanning cycle. This retention feature maintains the body upon a stable navigational course during possible periods of interruptions or fading of the thermal-energy signals emanating from a target. The retention feature permits a change of course only when a more intensive signal from a thermal-energy source situated in another direction is subsequently recorded, and also provides a variable threshold which blocks noise and weak signals from admittance to and a possible control of steering mechanisms.

A self-contained steering control circuit feature is provided for automatically increasing the scanning frequency of the equipment optical unit in accordance with the intensities of the thermal-energy signals which emanate from a target. This feature achieves an increased sensitivity of the scanning unit during an initial target seeking period by the selective use of a scanning frequency that may be favorably related to the time constant of the particular thermal-energy sensitive unit utilized in the scanning unit, and a more rapid repetition of the thermal-energy steering signals towards the termination of a body flight when maximum sensitivity is no longer necessary.

Examples of thermal-energy sensitive units commonly used in detection systems are thermocouples, thermopiles, photoelectric cells and bolometers. In the preferred embodiment of the invention as disclosed herein a thermistor-bolometer is used as the thermal-sensitive unit. A bolometer is an instrument used to detect or measure small quantities of thermal-energy by means of a thermally induced change in the bolometer resistance. The sensitive elements in a thermistor-bolometer are made from a thermistor material which is especially thermal-sensitive and the resistance of which varies more rapidly with temperature variants than would the resistance of pure metals such as copper. A thermistor-bolometer may be constructed according to any suitable design, such as that disclosed in Patent 2,414,792, issued January 28, 1947, to J. A. Becker. Thermistors may be made in any suitable manner, for example that disclosed in Patent 2,414,793, issued January 28, 1947, to J. A. Becker and H. Christensen. Good results have been obtained by using thermistors made from the combined oxides of manganese, nickel and cobalt.

When thermistors are utilized as sensitive elements in a bolometer they are usually connected as arms of a simple bridge circuit. This bridge is held in a normally balanced condition and is adjusted so as to remain in balance while the detection system is scanning an area under observation, for the associated optical system is designed to furnish signals which are substantially independent of any differences existing between local temperatures and the background temperature of an object viewed. When an object with a thermal-diffusiveness differing from that of an area under observation comes within the orbit of the system the amount of thermal-energy directed upon the thermistor-strip will vary, occasioning a corresponding variation in the resistance of the strip and initiating an unbalance of the bridge and a resultant voltage potential across the bridge. This potential variation is amplified and actuates signal indicators or controls. Approximately $10^{-7}$ watts of energy incident upon the strip will be detected and will raise the strip temperature about a millionth of a degree centigrade while the resultant voltage delivered at the amplifier will be about one microvolt. With devices using thermistor-bolometers it is possible to detect the radiation from a man's hand at a distance of five hundred feet, from a man's body at a thousand feet and from large heat sources, such as ships, at distances of ten miles or more. Objects can be detected by night and day and since these detection devices emit no tell-tale signals secrecy in obtaining the bearings of a target is possible.

Referring to the drawings:

Fig. 1A shows schematically a front end view of a bolometer utilized in the equipment of Fig. 1;

Figure 1:
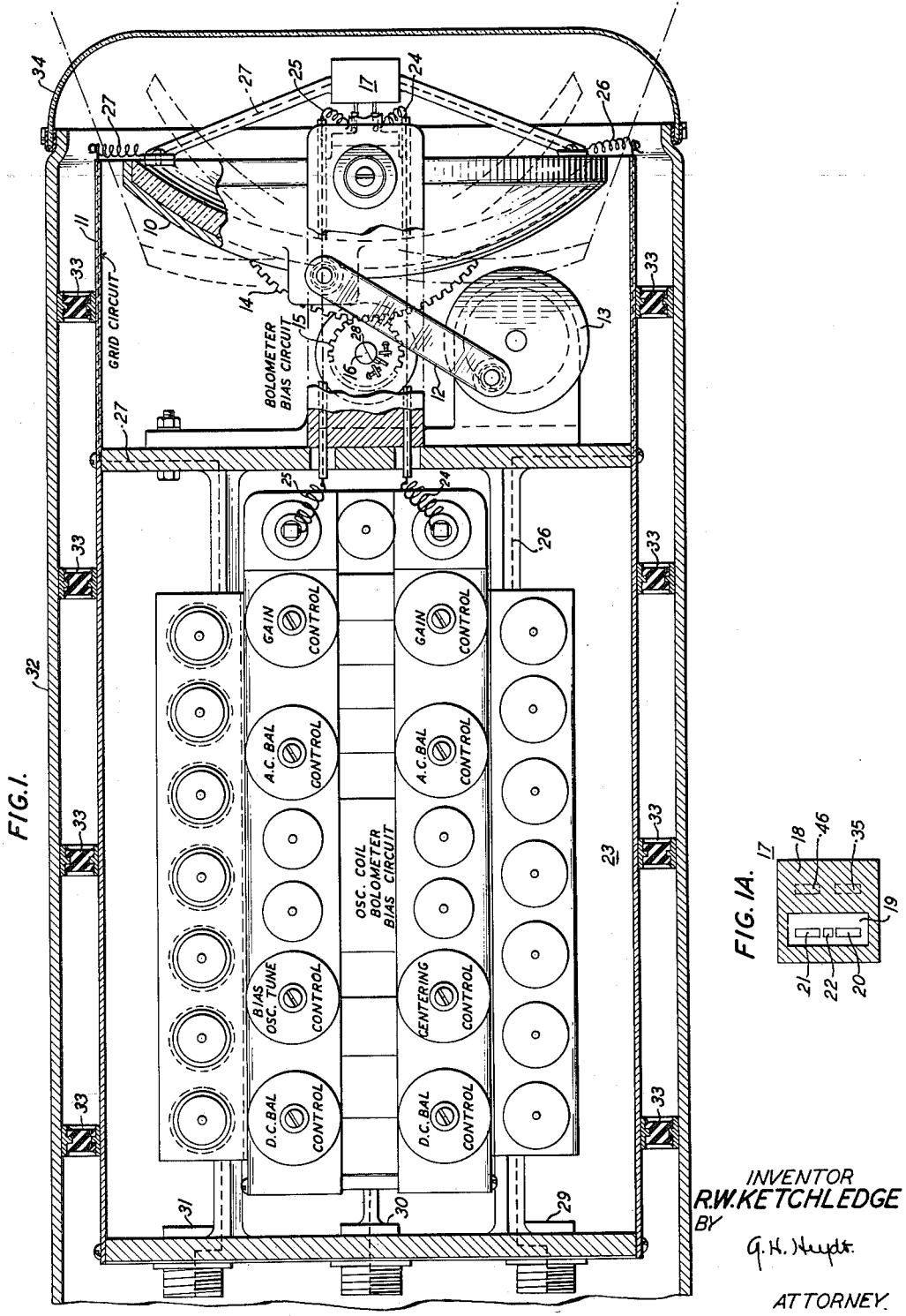
Fig. 1 shows schematically a top view of equipment in accordance with the invention.

Referring to Fig. 1 there is shown a parabolic reflector 10 positioned within a chamber 11. The reflector 10 is mounted for oscillation in azimuth about a vertical axis and is motivated by a crank shaft 12 which is actuated by a motor 13. The motor 13 may be energized in any well-known manner. Attached to the reflector 10 is a gear sector 14 and this sector is so designed in relationship to the reflector 10 that the center of the sector 14 and the rotation axis of the reflector 10 are in alignment as illustrated. The gear sector 14 meshes with a gear 15 which is secured to a potentiometer shaft 16. Situated in the focal plane of the reflector 10 is a bolometer unit 17.

Referring to Fig. 1A which is a schematic drawing of the bolometer 17 of Fig. 1, the bolometer 17 includes a housing 18, and a window 19 which may comprise a sheet of silver chloride or any other suitable material that will pass infra-red radiations. Situated within the bolometer 17 and positioned in view behind the window 19 are two thermal-energy sensitive elements 20 and 21. The elements 20 and 21 are in vertical alignment with each other, but are electrically independent of each other, and serve as part of an optical unit by means of which an independent viewing of an upper half and a lower half of a vertical field of view is accomplished. The elements 20 and 21 are partially shielded from external thermal-energy radiations by the housing 18 of the bolometer 17, but thermal-energy collected by the reflector 10 may impinge upon the front surfaces of the elements 20 and 21 through the window 19 in the bolometer 17. Positioned between the elements 20 and 21 and facing the reflector 10 is a reflecting prism 22. Also contained within the bolometer 17 and completely shielded from external radiation by the housing 18 are resistors 35 and 46 the functions of which will be explained.

Situated within the chamber 11 of Fig. 1 is an electronic unit designated 23 which includes amplifiers, phase inverters, rectifier units and steering controls the functions of which will hereinafter be explained. Leads 24, 25, 26 and 27 connect the bolometer 17 to the electronic equipment 23. The leads 24 and 25 may be used as bolometer output leads to the electronic equipment 23. Short coiled springs are used as illustrated as parts of the connecting leads 24, 25, 26 and 27 at points where it is necessary to bridge stationary and moving equipment parts, and these springs provide requisite flexibility between these parts and also facilitate shock mounting of the parts. The chamber 11 is positioned within a container 32 and is shock mounted in relation to the container by shock mountings 33. Output conductors from the electronic equipment 23 are led to steering mechanisms through ducts 29, 30 and 31.

The container 32 may be hermetically sealed to avoid possible difficulties resulting from the rarified atmospheric conditions prevailing at high altitudes. The sealing of the container also facilitates the provision of auxiliary heating of the equipment when it is desirable to offset the low temperatures of the upper air. Air pressure at fifty thousand feet is approximately fifteen percent of the pressure at sea level, and temperatures at the upper level are of the order of minus seventy degrees Fahrenheit. The container 32 has a window 34 which may be dome-shaped in order to provide strength and streamlining effects. The window 34 may be hemispherical in shape or may be flattened as illustrated to provide a close clearance for the scanning parabolic reflector 10.

An obvious necessity exists to design towards minimization of space, weight and power in the equipment according to the invention. In attainment of these objectives the reflector 10 is pivoted near the center of the depth dimensions of the complete reflector unit and by a suitable proportioning of the crank shaft 12, and by use of ball bearings very little power is required to actuate the reflector. Also in order to achieve the azimuthal oscillation of the reflector 10 the use of the crank mechanism 12 is desirable on the basis of simplicity, compactness, stability and low frictional dissipation. The crank mechanism 12 withstands the high accelerations incidental to the invention, and the rigidity obtained from a direct linkage drive is an advantage. By designing the driving mechanism so that the oscillation amplitude is greater than that actually required the variation in the rate of scan due to the sinusoidal type of drive is not excessive in the range of interest. This additional amplitude range may also provide a margin for a mechanical delay correction feature to compensate for possible delay in signal amplification in relation to the actual time at which a target is traversed by the equipment scanning unit. This correction feature may comprise a variable backlash in the relationship of the gears 14 and 15, or an adjustable lag feature may be introduced into the connection between the shaft 16 and the gear 15 in any manner well known to those skilled in the art such for example, as illustrated by a pin 28 which is secured to the shaft 16 and which has a freedom of movement between two adjusting screws secured to the gear 15.

Figure 2:
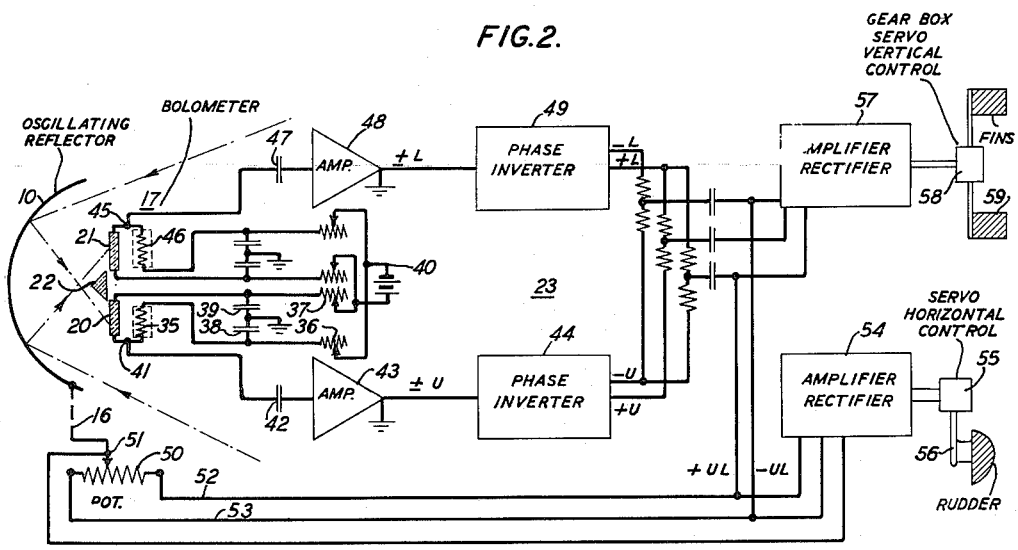
Fig. 2 is a schematic illustration of the equipment of Fig. 1 and shows the interrelationship of the equipment component parts.

Fig. 2 shows the interrelationship of the parts used in the system of Fig. 1 and particularly that part of Fig. 1 which comprises the electronic equipment and which is titled generally 23. Thermal-energy sensitive elements 20 and 21 are shown situated in vertical alignment with each other. The element 20 is adapted to view the upper portion while the element 21 views the lower portion of a field of view of the parabolic reflector 10, or it may be said that the unit 17 has two independent fields of view. Since it is advisable that the zones of view of element 20 and element 21 be electrically independent of each other, a separation of the elements is advisable. However, this results in a separation blind spot in the optical system between ends of the elements 20 and 21. A triangular prism 22 is positioned between the element ends so as to afford complete optical coverage and eliminate the blind spot. The apex of the triangular prism 22 faces the reflector 10, and the ridge of the prism is centered on the optical axis of the reflector and is parallel to the scan direction. The prism 22 reflects thermal-energy radiations, which may be focussed by the reflector 10 in the region of the blind spot, upon either the element 20 or upon element 21, or on both elements depending upon which surface or surfaces of the prism the reflected radiations impinge upon. The use of the prism 22 permits shortening of the elements 20 and 21 by an amount equal to the separation of the element ends from the optical axis of the reflector 10. The single exposed elements 20 and 21 are utilized in this embodiment of the invention so that the polarity of a signal initiated by these sensitive elements may be independent of the direction of scan.

The element 20 is contained within the bolometer 17 and is connected as an arm in a bridge configuration. The configuration includes the resistor 35 which may be of a similar size and material as the element 20. The resistor 35 is completely shielded from external thermal-energy radiations by the housing of the bolometer 17 and is utilized as a thermal compensator to the element 20. Current from electromotive source 40 is supplied to the bridge through a pair of adjustable resistors 36 and 37, and connected in the bridge circuit are a pair of condensers 38 and 39 one plate of each condenser being grounded. Variations in the temperature of the element 20 caused by variations in the amount of thermal-energy radiation focussed upon the element by the reflector 10, which collects the radiation from an area under observation, initiate a corresponding resistance variation in the element. The resistance variation results in a momentary unbalance of the bridge and a resultant potential between a point 41 and ground. This potential variation signal pulse is led through a condenser 42 to an amplifier 43 and thence to a phase inverter 44 which supplies further gain to the signal pulse, acts as a voltage limiter and also provides two signal output terminals.

The top output terminal of the phase inverter 44 may deliver unidirectional signal pulses of negative polarity. The lower terminal delivers unidirectional signal pulses of equal amplitude but of opposite polarity to those contained in the upper terminal.

The element 21 is also contained in a bridge circuit and initiates signals in the manner described in relation to the element 20. Signals initiated by the element 21 are led from a common connection point 45 situated between the element 21 and the resistor 46, through a condenser 47 and an amplifier 48 to a phase inverter 49. The top output terminal of the phase inverter 49 may deliver unidirectional signal pulses of negative polarity while the lower terminal may deliver unidirectional signal pulses of equal amplitude but of opposite polarity to those contained in the upper terminal. For convenience in interpreting the drawings some conductors beyond the phase inverters are marked "U" and "L" depending upon whether they may contain signal pulses from the upper or lower fields of view.

The signals from the upper and lower fields of view are combined and fed into a circuit containing a potentiometer 50 and a potentiometer arm 51 as shown. The potentiometer arm 51 is connected to a potentiometer shaft 16 which in turn is coupled through a series of gears, which are not shown in this drawing, but the functions of which were discussed in relation to Fig. 1, to the reflector 10. The connection of the potentiometer mechanism to the scanning reflector provides a connecting mechanism for conveying information as to the azimuthal position of the reflector 10 and the bolometer 17 to presentation and steering control circuits as will be explained. A potentiometer circuit conductor 52 may contain the positive pulses from the upper and lower fields of view if both upper and lower pulses are present, or the pulses may be from the upper or lower fields of view. The conductor 53 may contain identical signal pulses but of opposite polarity from those contained in conductor 52. The potentiometer 50 in conjunction with the potentiometer arm 51 sets the electrical center of the system so that it corresponds with the system mechanical center. When the optical view of the scanning reflector 10 is situated along the system central axis there will be a zero signal registered at the arm 51 of the potentiometer 50.

Deviations of the potentiometer arm 51 back and forth, in synchronism with the motions of the reflector 10, will cause the polarity and amplitude of a signal pulse to be proportional to the navigational bearings of a target initiating signal pulses, in respect to the detection system. The potentiometer circuit which controls horizontal steering functions utilizes signal pulses from the upper or lower fields of view, or from both fields of view. The vertical steering circuit, as will be explained, utilizes a difference between the pulses from the upper and lower fields of view to control vertical steering functions.

When an unbalanced signal occurs at the arm 51 of the potentiometer 50 the resultant signal pulse is led to an amplifier-rectifier unit 54 and thence to a horizontal servo control 55 which actuates a horizontal guiding rudder 56 in accordance with the signal received. The operation of the vertical control signal circuit is similar to that of the horizontal control circuit as described except that the unbalance signal led to an amplifier-rectifier unit 57 may comprise a positive signal pulse from the upper field of view and/or a negative signal pulse from the lower field of view. From the amplifier-rectifier unit 57 the unbalance signal is led to a servo vertical control unit 58 which actuates elevator fins 59 in accordance with the detected signals.

Figure 3:
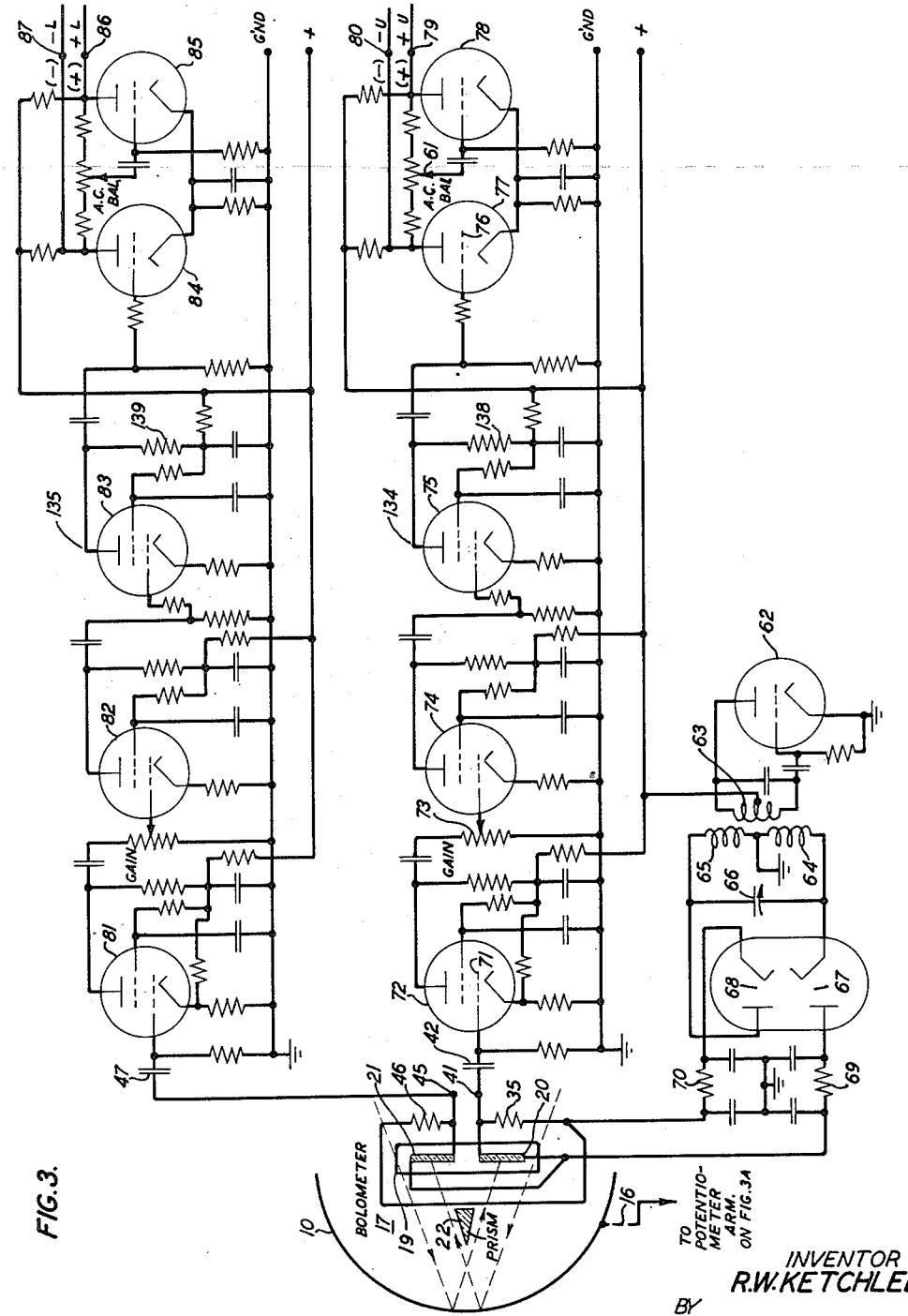
Fig. 3 is a circuit of a steering system as utilized in the embodiment of Fig. 1.

Referring to Fig. 3 here is shown a schematic circuit of the steering system as utilized in the embodiment of Fig. 1. An oscillator 62 furnishes a high voltage bias supply to the elements 20 and 21. Associated with the oscillator 62 are coils 63, 64 and 65. The coils 64 and 65 are connected in series and are tuned by a condenser 66. The tuning condenser 66 is not usually adjusted for peak tuning but may be operated as a control condenser so as to adjust the bias voltage of a bolometer 17 at a value desired, in the event that different types of interchangeable bolometer units are used. A stepped-up oscillator voltage is led from the coils 64 and 65 to a rectifier comprising twin-diode units 67 and 68 and is rectified. After rectification a resultant balanced positive and negative direct current output is led through stabilizing resistors 69 and 70 to the bolometer elements 20 and 21. A series of condensers are connected to ground as illustrated between ends of the resistors 69 and 70. The bolometer biasing network with two separated bridge networks as shown in Fig. 2 is in the interest of clarity and simplicity not the same as that shown in Fig. 3. The particular advantage of the balanced bolometer bias circuit shown in Fig. 3 is that it results in a minimum direct current potential at the common connection circuit points 41 and 45, and this is a desirable condition for it reduces the possibility of noise resulting from motions of connecting leads to the bolometer 17.

When the amount of radiation impinging upon the element 20 from the reflector 10 varies in intensity a signal pulse is initiated at the point 41 as described above. The signal pulse is led through a blocking condenser 42 to the control grid 71 of a tube 72, and the output from the tube 72 is fed through a gain control rheostat 73, through tubes 74 and 75 to a grid 76 of a tube 77. The tubes 72, 74 and 75 are in cascade and furnish a three-stage amplification unit. Tubes 77 and 78 comprise a phase inverter configuration which supplies two output terminals 79 and 80. The alternating current balance potentiometer 61 situated between tube 77 and tube 78 is adjusted so that the voltage output from tube 78 is equal in amplitude but of opposite polarity to the voltage output from the tube 77. The outputs from tubes 77 and 78 provide a balanced voltage supply to succeeding amplification units. The phase inverter tubes 77 and 78 are designed to limit the voltage output delivered to the steering controls and act as limiters delivering a voltage output up to a certain maximum amount of voltage. The output conductor 79 may contain a unidirectional signal pulse of positive polarity from the element 20 while the conductor 80 may contain a unidirectional signal pulse of equal amplitude but of opposite polarity to the pulse contained in conductor 79.

Signals originated by the element 21 are led from a point 45 through a condenser 47, amplifier tubes 81, 82 and 83 and also through phase inverter tubes 84 and 85 in a similar manner to that described in relation to a signal pulse initiated by the element 20. There are two output conductors 86 and 87 from the phase inverter units 84 and 85, and the conductor 86 may contain a unidirectional signal pulse of positive polarity originated by the element 21 while the conductor 87 may contain a unidirectional signal pulse of equal amplitude but of opposite polarity to the pulse contained in conductor 86.

Figure 3A:
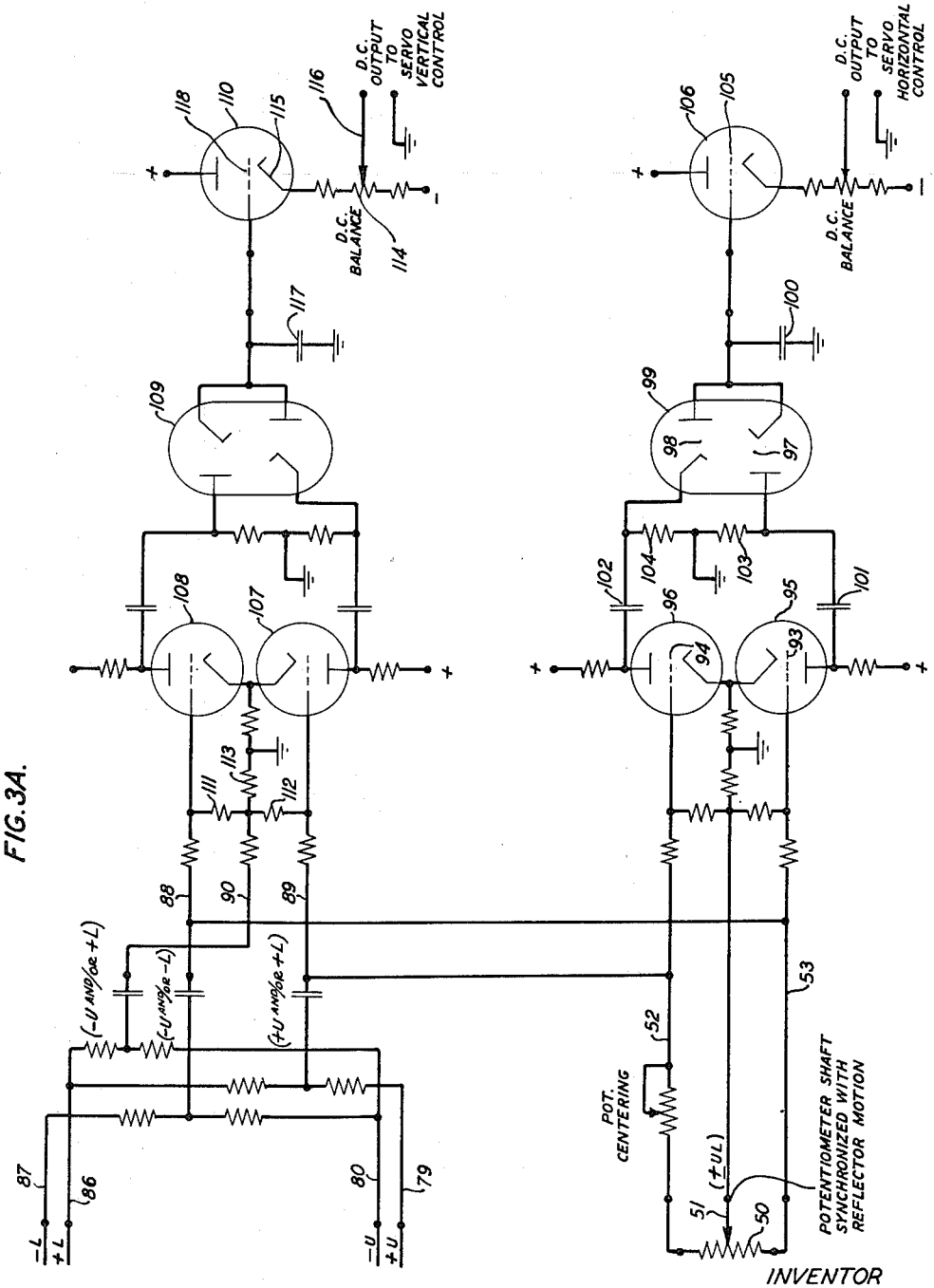
Fig. 3A is an extension of the circuit of Fig. 3.

Referring to Fig. 3A which is a continuation of the circuit of Fig. 3 it will be observed that currents flowing in the conductors 80 and 87 are combined and applied to a conductor 88 which may contain negative signal pulses from the upper and/or lower fields of view. Similarly, conductors 79 and 86 supply current to a conductor 89 which may contain positive signal pulses from the upper and/or lower fields of view. Currents flowing in conductors 80 and 86 are supplied to a conductor 90 which may contain an unbalancing signal comprising positive signal pulses initiated by the element 21 and/or negative signal pulses initiated by the element 20. The conductors 88 and 89 are connected to conductors 52 and 53 which connect into a circuit containing the potentiometer 50 and the potentiometer slider arm 51.

If a target is situated at a point upon the central axis of the system equal pulses of an opposite polarity will appear on conductors 52 and 53 and the potentiometer slider arm 51 at that instant will be positioned at the electrical center of the potentiometer 50. Consequently equal pulses of opposite polarity are transmitted to grids 93 and 94 of tubes 95 and 96. Accordingly, outputs from the tubes 95 and 96 will also vary by equal amounts, but in opposite directions and will cancel out each other at diodes 97 and 98 of a rectification tube 99 so that the tube 99 produces no signal output voltage and accordingly no charge will be impressed upon a condenser 100 the potential on which acts upon a control grid 105 of a tube 106. The output from the tube 106 controls the horizontal steering mechanisms as will be explained. If the condenser 100 happens to retain a charge from a former pulse action at the particular time that the outputs from tubes 95 and 96 are equal, the condenser 100 will in time discharge to zero unless it receives a subsequent charge. When the outputs from the tubes 95 and 96 are balanced and equal, bias charges are built up on condensers 101 and 102, and until such time as these charges are dissipated to ground, through resistors 103 and 104, the diodes 97 and 98 of the tubes 99 will not conduct on pulses weaker than the last recorded pulse, and will remain non-receptive until such time as a subsequent and stronger pulse signal is received. This action of the condensers 101 and 102 and of the tube 99 provides a threshold effect which makes the system receptive to the strongest source of thermal energy in the system field of view. By this action, lesser or more remote targets or extraneous interference noises are unable to register and are prevented from reaching the condenser 100 and effecting steering controls.

If the system is not in alignment with a target the outputs from the tubes 95 and 96 will be unbalanced and the condenser 100 will receive a charge the polarity of which will depend upon whether the tube 95 or tube 96 is delivering the larger output at that particular instant. If, for example, the system is off axis in a direction such that the potentiometer slider arm 51 is nearer the lower end of the potentiometer 50, at the particular instant that the signal pulses are received, it will follow then that the pulses recorded at the girds 93 and 94 of the tubes 95 and 96 are unequal for the voltage on the grid 93 becomes the larger voltage. Accordingly, the rectified output from the diode 97 of the tube 99 is larger than the output from the diode 98, and a residual charge will be held by the condenser 100 the top plate of which will now be positively charged. The charge received by the condenser 100 is a direct current voltage proportional to the target bearing as amplified in accordance with the signal intensity, if the signal pulse recorded is sufficiently large the condenser 100 will charge proportional to the signal intensity alone due to the voltage limiting action of the phase inverter tubes, 77, 78, 84 and 85. The condenser 100 in discharging acts upon the control grid 105 of tube 106 as stated above. It will be appreciated that the potentiometer circuit provides proportional horizontal steering control, modulates the recorded signal pulses and furnishes a voltage, to charge the condenser 100, that is proportional to the target bearing in relation to the heading direction of the controlled body.

The vertical steering control responds to the difference in intensity of the signals from the upper and lower fields of view. The vertical steering control is proportional to signal intensity when the signals are weak, but when the target signals are strong and are limited in the phase inverter tubes the vertical steering is of an on and off type except when the target radiations illuminate portions of both the sensitive elements 20 and 21.

The vertical control circuit comprising tubes 107, 108, 109 and 110 is similar in operation to the operation of the horizontal control circuit as described, except that the unbalancing signal for this circuit is applied by way of the conductor 90 and may comprise positive pulses from the element 21 in the lower field of view, and/or negative signal pulses from the element 20 in the upper field of view. Pulses reaching the grids of the tubes 107 and 108 will be of an opposite polarity to each other. If it happens that a target is centered upon the longitudinal axis of the system the unbalancing signal contained in conductor 90 will comprise positive and negative pulses of equal amplitude which will cancel each other and result in a zero unbalance signal. The pulses upon the grids of the tubes 107 and 108 will be of opposite polarity but of equal amplitude so that the direct current output from the rectifier 109 will also be zero. If the conductor 90 supplies unbalanced signal pulses of a predominating polarity the outputs from tubes 107 and 108 will be unbalanced and the polarity of the output from the rectifier 109 will depend upon whether the tube 107 or tube 108 is delivering the largest output at that particular instant.

It will be understood that when a target is first located, and before any vertical control has been exercised, the system line of sight to the target will usually be such that recorded signals will be situated predominantly in the upper field of view controlled by the element 20. Later, the recorded signals may tend to be situated predominantly in the lower field of view dominated by the element 21. The vertical control circuit unbalance signal will usually comprise the entire output of the positive part of a signal pulse in the lower field or view or the negative part of a pulse from the upper field of view. When a target thermal-image impinges equally upon both the upper and lower fields of view the resultant signal will be a composite positive signal pulse initiated by the element 21 and a negative pulse initiated by the element 20, the combined pulses being a zero control value. When this condition obtains the vertical steering control circuit is balanced and no course correction is necessary.

If the body happened to be in horizontal alignment with a target, but not in vertical alignment, the horizontal steering controls receive no correction signal for the slider arm 51 will be situated at the electrical center of the potentiometer 50 at the instant at which a target signal is received. However, a vertical control unbalance or correction signal will appear in the conductor 90 due to differences in the amounts of thermal-energy received by the elements 20 and 21 and this signal will affect the outputs of tubes 107 or 108 in accordance with the unbalance signal characteristics. Resistances 111, 112 and 113 are preferably designed so that the resistance 113 is of a lower impedance than that of resistances 111 and 112 so as to minimize interference between the vertical and horizontal steering control circuits.

The outputs from the tubes 106 and 110 may be utilized to regulate servo controls in any suitable manner such as is known in the art, or these outputs may be used to convey either collision or homing course steering data as disclosed in the pending application of R. W. Ketchledge, Serial No. 570,180, filed December 29, 1944, which issued as Patent No. 2,826,380 on March 11, 1958.

Figure 4:
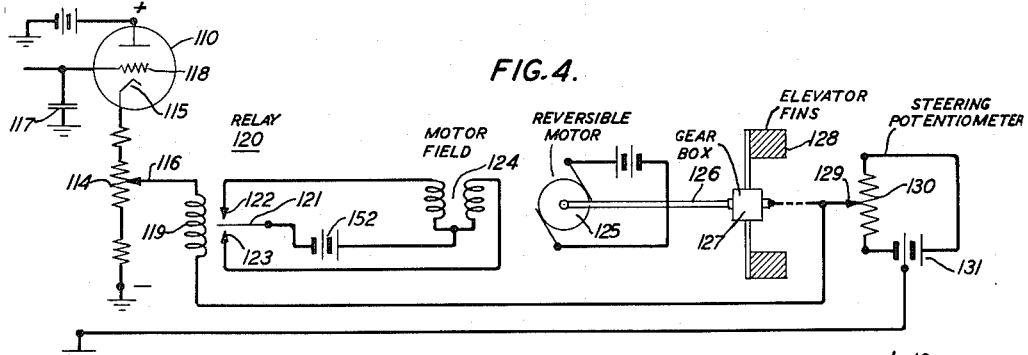
Fig. 4 is a schematic showing of a proportional vertical steering control circuit which may be used in the embodiment of Fig. 1.

Referring to Fig. 4, there is shown schematically a circuit for utilizing target signals from the vertical control circuit output tube 110 of Fig. 3A, to obtain a vertical steering control function. A direct current balance potentiometer 114 is connected between a cathode 115 of the output tube 110 and ground, and may be adjusted by a potentiometer slider arm 116 in order that the normal voltage across a winding 119 of a marginal relay 120 may be of a zero potential when no target signal is being received. The relay 120 has an armature 121, an upper contact 122, and a lower contact 123. The armature 121 is connected through an electromotive source 152 to a field winding 124 of a reversible motor 125. Operation of the relay 120 energizes the field 124 of the reversible motor 125, and actuates the motor 125 in a direction dependent upon which contact of the relay 120 is engaged by the relay armature 121. If the motor 125 is so wired, operation of the relay 120 and engagement of the armature 121 with the upper contact 122 may cause the motor 125 to turn in a clockwise direction, while engagement of the armature 121 with the lower contact 123 may cause the motor 125 to turn in a counter-clockwise direction. A drive shaft 126 from the motor 125 is connected to a gear box 127. Mechanically connected to gears in the gear box 127 are elevator control fins 128 which may be so connected to the gears, in the gear box 127, that revolution of the motor 125 in a clockwise direction causes a raising of the elevator fins 128, while revolution of the motor in a counter-clockwise direction results in a lowering of the elevator fins. A potentiometer slider arm 129 which is adaptable for movement along a potentiometer 130 may be suitably coupled to gears in the gear box 127 in a manner known in the art. A turning movement of the motor 125 turns the drive shaft 126, and the potentiometer slider arm 129, in a corresponding direction.

This system operates as follows; when a positive potential from the condenser 117, as described in relation to Fig. 3A, is received at grid 118 of the tube 110 the grid 118 becomes positive, and will cause the tube 110 to pass more current. Accordingly, cathode 115 of the tube 110 will also become more positive, and the slider arm 116 of the potentiometer 114 will have a positive potential. A positive voltage from the potentiometer slider arm 116 will be impressed across the winding 119 of the marginal relay 120, and will actuate the armature 121 which will engage the upper contact 122 of the relay, provided that the relay is so wired. The relay 120 is operated by target signal pulses and the direction of operation of the relay armature 121 depends upon the polarity of the operational pulse. Operation of the relay 120 and engagement of the upper contact 122 causes the motor 125 to turn in a clockwise direction as explained above. Rotation of the motor 125 also actuates the slider arm 129 of the potentiometer 130. Movement of the slider arm 129 along the potentiometer 130 regulates an output from a direct current source 131. When the slider arm 129 has moved to a point on the potentiometer 130 at which point and instant a voltage output from the source 131, through the slider arm 129, if of magnitude equal to that of the potentiometer 114, the potential across the winding 119 of the relay 120 will be of zero potential, and the relay 120 will restore to a normal non-operated condition and disengage the armature 121 from the upper relay contact 122. Release of the relay 120 stops the motor 127 and also stops the upward movement of the elevator fins 128.

If the polarity of a signal pulse applied to the grid 118 of the tube 110 of Fig. 3A, is negative similar effects will occur to those described above, except that the marginal relay 120 will energize in an opposite direction and the armature 121 will engage the lower relay contact 123 causing the motor 125 to turn in a counter-clockwise direction.

Figure 5:
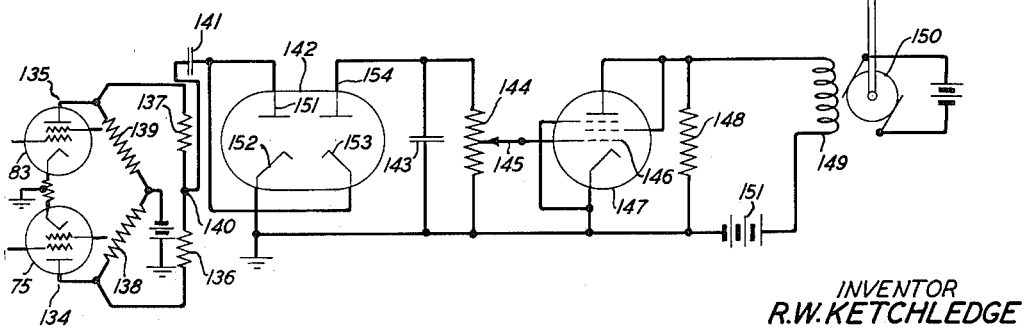
Fig. 5 is a schematic drawing of a motor speed control circuit as may be utilized in the system of Fig. 1 for automatically varying the scanning frequency of an optical unit in accordance with the strength of recorded signals.

Referring to Fig. 5 there is shown a motor speed control circuit for automatically varying the speed of a scanning parabolic reflector in accordance with the relative strengths of thermal-energy target signals. This circuit may be utilized in the system of Fig. 1. Two resistors 136 and 137 are connected to plates 134 and 135 of amplifier tubes 75 and 83 of Fig. 3, as shown. The resistors 136 and 137 are connected across a bridge network the arms of which comprise tubes 75 and 83, and resistances 138 and 139. The resistances 136 and 137 are of high resistance as compared to resistances 138 and 139. A central point 140 between resistors 136 and 137 is connected to a voltage multiplier circuit comprising a condenser 141, twin diode tube 142, condenser 143 and a potentiometer 144. A potentiometer slider arm 145 completes a connection from the potentiometer 144 to a grid 146 of a tube 147. Bridged across the output of the tube 147 is a resistance 148, which is connected across a field 149 of a direct current motor 150. The motor 150 actuates the scanning parabolic reflector 10 of Figs. 1, 2 and 3.

The circuit operates as follows; signal pulses received at the junction point 140 and dependent upon whether the signals originated in the upper and/or lower fields of view, as explained in relation to Figs. 3 and 3A, are applied from the point 140 to the condenser 141. Positive pulses from the point 140 will cause plate 151 of tube 142 to conduct with cathode 152 thereby charging condenser 141 so that a terminal of condenser 141 connected to plate 151 will possess a negative potential relative to the potential of a plate of condenser 141 connected to the junction point 140. Negative pulses from point 140 are applied through the condenser 141 to a cathode 153 of tube 142. By conduction a plate 154 of tube 142 is carried negative by the sum of the preceding residual charge on condenser 141, plus the negative voltage impressed from the point 140. Thus pulses of either positive or negative polarity at junction point 140 produce a negative output on the top terminal of the condenser 143. The charge output from the condenser 143 provides a negative direct current voltage across the potentiometer 144, and results in a negative direct current voltage on the control grid 146 of the tube 147. As the target signal pulses received at the point 140 grow stronger, in accordance with the approach of the body to a target, the grid bias on the grid 146 will increase, and will cause a decrease in the space current in the tube 147. Decrease of the space current in the tube 147 decreases the current passing through the field 149 and increases the speed of the motor 150. As the speed of the motor increases, due to the decrease of current in the field 149, the scanning speed of the reflector 10 will increase up to a time when the tube 147 is completely blocked. When the tube 147 is blocked the current in the field 149 is obtained from a direct current source 151 through the resistance 148. The resistance 148 may be designed to permit maximum motor speed for the mechanical loading factors involved in the system.

The resistors 136 and 137 should be of sufficiently low resistance to permit the condenser 141 to receive a voltage charge within the duration instant of a target signal pulse, but should not be of such low resistance as to permit inductive interference between upper and lower fields of view. In the rectifier voltage multiplier circuit the time constant of the condenser 143 and of the potentiometer 144 may be long as compared with the scanning period prevailing at the slowest rate of scan. The capacity of the condenser 141 may be equal to or less than the capacity of the condenser 143, in order to prevent a single extraneous noise or signal pulse from increasing the scanning frequency. The number of recorded target signals necessary to increase the scanning frequency is determined by the ratio of the capacity of the condenser 141 to the capacity of the condenser 143. The ratio between the time constants of the condenser 143 and the potentiometer 144 determines the time period required to decrease the scanning frequency when a target signal is no longer received. The field winding 149 may be designed so that the motor 150 may operate on high voltage potentials and low current, so as to utilize tube power in an efficient manner. The slider arm 145 in relation to the potentiometer 144 furnishes an adjustment to vary the control action sensitivity of the system.

It is to be understood that the above-described embodiments are illustrative examples and that various modifications may be made without departing from the spirit of the invention.

What is claimed is:

1. In a steering system for a moving body comprising steering members and a control mechanism for effecting movement of said members in accordance with thermal-energy signals initiated by a target situated in an area under observation the combination of, a unit comprising two thermal-energy sensitive elements having different fields of view and situated in alignment with each other, means for synchronously scanning said fields of view, collecting thermal-energy emanating therefrom and focussing it upon the respective element associated with a particular field of view, a circuit including said elements, means in said circuit for producing electrical pulses in response to variations in the amounts of thermal-energy radiation collected from each field of view, said variations being initiated by sources of temperature discontinuity situated in said fields, means in said circuit for translating said electrical pulses into a first series of signal pulses corresponding to the azimuthal angular bearing of said target in relation to the longitudinal axis of said body, means in said circuit for producing a second series of signal pulses in accordance with a differential between the amounts of thermal energy received from said fields of view, means for translating said first and second series signals into steering control functions, means in said circuit for retaining an output voltage indication of the bearing of the largest temperature discontinuity source encountered in a given scan, said retaining means causing said steering means to remain immobile until such time as a larger temperature discontinuity source is subsequently scanned, and means in said circuit for automatically varying the scanning rate of said scanning means in accordance with the amplitude of said electrical pulses.

2. In a steering system for a moving body comprising horizontal and vertical steering members and a control mechanism for effecting movement of said members in accordance with thermal-energy signals initiated by a target situated in an area under observation the combination of, a unit comprising two thermal-energy sensitive elements having different fields of view and situated in vertical alignment with each other, means for scanning said area and collecting thermal energy emanating therefrom and focussing it upon said elements, a circuit including said elements, means in said circuit for producing electrical pulses in response to variations in the amounts of thermal-energy radiations impinging upon either element, means in said circuit for translating a portion of said pulses into a first series of signal pulses according to the azimuthal angular bearing of said scanning means in relation to the longitudinal axis of said body, means in said circuit for producing a second series of signal pulses in accordance with the differential between the amounts of thermal-energy radiations received from said fields of view, means for translating said first and second series siginals into steering control functions, means in said circuit for retaining a voltage indicative of the bearing of the thermal-energy source of greatest intensity encountered during said area scan, and means for maintaining said control mechanism responsive only to said source of maximum intensity until a thermal-energy source of still greater intensity is encountered.

3. In a steering system for a moving body comprising vertical and horizontal steering members and control means for effecting movement of said steering members in one direction or another direction in accordance with the thermal-energy pulse control signals applied to said control means, the combination of means for producing a first series of signals determined by a direction and proportional to the angular bearing of a target relative to the longitudinal axis of said body, means for producing a second series of signals determined by the vertical position of said target in relation to said body, means for resolving said first and second signal series into steering control functions, means in said signal series producing means for retaining a voltage indicative of a major pulse signal, and means to render said steering system unresponsive to subsequent signals of lesser magnitude than said major signal.

4. In a thermal-energy steering system for directing a body towards a target situated within an area of scan the combination of, a thermal-energy sensitive unit, means for performing an oscillatory scanning of said area, collecting thermal-energy radiations originating therein and focussing them upon said unit, a circuit including said unit, means in said circuit for originating signal pulses in accordance with variations in the amounts of radiation focussed upon said unit, and means in said circuit for controlling the oscillation rate of said scanning means in accordance with the amplitude of said pulses so that said oscillation rate is at a maximum when said system is in proximity to said target.

5. In a thermal-energy steering system for directing a moving body towards an object situated in an area of scan the combination of, a thermal-energy sensitive unit, means for scanning said area at a predetermined rate of scan, collecting radiations emanating therefrom and directing them upon said unit, an indication circuit including said unit, means in said circuit for initiating voltage variations in accordance with variations in the amounts of thermal-energy radiation directed upon said unit, and means in said circuit for controlling the rate of scan of said scanning means in accordance with the persistence and amplitude of said voltage variation so that said rate of scan increases as said object is approached.

6. In a thermal-energy system for steering a moving body in flight towards targets situated in an area under observation the combination comprising, means for scanning said area, means for collecting thermal-energy radiations originating within said area, means for translating variations in the amounts of said received radiations into voltage potentials of a polarity and amplitude proportional to the intensity of said variations, means for retaining a voltage potential indicative of the bearing of a thermal-energy source of greatest thermal intensity encountered in a given scan, means for disabling the steering functions of said body during the voltage potential retention period, and means for actuating said steering functions under control of larger voltage potentials subsequently initiated.

7. In a thermal-energy steering system including horizontal and vertical control members for guiding a moving body to a destination the combination comprising, means for scanning an area so as to collect thermal-energy radiation from two independent fields of view, means for resolving variations in the amounts of said collected radiations into a first electrical pulse series of a polarity and amplitude proportional to the bearing of said destination in relationship to said body, means for resolving said collected radiations into a second electrical pulse series based upon a differential between amounts of radiation collected from each field of view, means for translating said first and second pulse series into steering control functions, and means to control the operational frequency of said scanning means in accordance with the varying amplitudes of said pulse series.

8. In an automatic thermal-energy steering system the combination of a thermal-energy sensitive unit, means for scanning an area, means for collecting thermal-energy radiations emanating from said area and focussing them upon said unit, a circuit including said unit, means in said circuit for initiating voltage variations proportional to variations in the amounts of thermal-energy radiations impinging upon said unit, means in said circuit for establishing a variable threshold of reception for said voltage variations, said establishing means including means for retaining voltages indicative of the bearing of the thermal-energy source of maximum intensity encountered in a given scan and means for maintaining said steering system responsive only to said source of maximum intensity until such time as a larger source of thermal-energy radiation of still greater intensity is encountered by said scanning means.

References Cited in the file of this patent

UNITED STATES PATENTS

| | | |
|---|---|---|
| 1,121,563 | Leon | Dec. 15, 1914 |
| 1,312,510 | Baker | Aug. 12, 1919 |
| 1,467,154 | Hammond | Sept. 4, 1923 |
| 2,410,831 | Maybarduk et al. | Nov. 12, 1946 |
| 2,417,112 | Kettering | Mar. 11, 1947 |
| 2,420,676 | Peterson | May 20, 1947 |
| 2,424,193 | Rost et al. | July 15, 1947 |
| 2,439,294 | Hammond | Apr. 6, 1948 |
| 2,446,024 | Porter et al. | July 27, 1948 |

FOREIGN PATENTS

| | | |
|---|---|---|
| 132,301 | Great Britain | Sept. 5, 1919 |
| 352,035 | Great Britain | June 22, 1931 |
| 384,325 | Great Britain | Dec. 5, 1932 |